United States Patent
Yu et al.

(10) Patent No.: US 11,289,760 B2
(45) Date of Patent: Mar. 29, 2022

(54) BATTERY PROTECTION STRUCTURE AND BATTERY MODULE COMPRISING SAME

(71) Applicant: LG CHEM, LTD., Seoul (KR)

(72) Inventors: Seung-Sik Yu, Daejeon (KR); Sung-Jong Kim, Daejeon (KR); Tae-Sung Kim, Daejeon (KR); Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 402 days.

(21) Appl. No.: 15/744,320

(22) PCT Filed: Jul. 18, 2016

(86) PCT No.: PCT/KR2016/007806
§ 371 (c)(1),
(2) Date: Jan. 12, 2018

(87) PCT Pub. No.: WO2017/069384
PCT Pub. Date: Apr. 27, 2017

(65) Prior Publication Data
US 2018/0219197 A1 Aug. 2, 2018

(30) Foreign Application Priority Data

Oct. 22, 2015 (KR) ........................ 10-2015-0147515

(51) Int. Cl.
*H01M 50/20* (2021.01)
(52) U.S. Cl.
CPC ........ *H01M 50/20* (2021.01); *H01M 2220/20* (2013.01)
(58) Field of Classification Search
CPC .......... H01M 2/1077; H01M 2220/20; H01M 10/50; H01M 10/00; H01M 2/10;
(Continued)

(56) References Cited

U.S. PATENT DOCUMENTS

| 8,859,131 B2 | 10/2014 | Kim et al. |
| 8,956,751 B2 | 2/2015 | Noh et al. |

(Continued)

FOREIGN PATENT DOCUMENTS

| JP | 2010-272520 A | 12/2010 |
| JP | 2015-149163 A | 8/2015 |

(Continued)

OTHER PUBLICATIONS

International Search Report (PCT/ISA/210) issued in PCT/KR2016/007806, dated Oct. 25, 2016.

*Primary Examiner* — Kiran Akhtar
(74) *Attorney, Agent, or Firm* — Birch, Stewart, Kolasch & Birch, LLP

(57) ABSTRACT

Disclosed are a battery protection structure, which is suitable for preventing deformation caused by physical stress at a coupling portion of a base plate and an end plate, which are stacked sequentially, and a battery module comprising the battery protection structure. The battery protection structure includes: a base plate located below a battery assembly and having a male screw member around the battery assembly; an end plate located at a side of the battery assembly on the base plate; and a reinforcing member provided below the end plate and located between a barrier of the end plate and a flange protruding from the barrier, wherein the male screw member passes through the reinforcing member and the flange, and a female screw is coupled to a male screw of the male screw member on the reinforcing member.

12 Claims, 4 Drawing Sheets

(58) Field of Classification Search
CPC .. H01M 50/20; H01M 50/202; H01M 50/204; H01M 50/207; H01M 50/209; H01M 50/258; H01M 50/262; H01M 50/264
See application file for complete search history.

(56) References Cited

U.S. PATENT DOCUMENTS

| | | | | |
|---|---|---|---|---|
| 2012/0040237 | A1* | 2/2012 | Hamada | H01M 50/20 |
| | | | | 429/159 |
| 2012/0115004 | A1* | 5/2012 | Park | H01M 10/0525 |
| | | | | 429/120 |
| 2013/0288094 | A1* | 10/2013 | Noh | H01M 10/0413 |
| | | | | 429/99 |

FOREIGN PATENT DOCUMENTS

| | | |
|---|---|---|
| JP | 2015-153470 A | 8/2015 |
| KR | 10-2011-0062996 A | 6/2011 |
| KR | 10-2013-0122323 A | 11/2013 |
| KR | 10-2014-0121730 A | 10/2014 |

* cited by examiner

BATTERY PROTECTION STRUCTURE AND BATTERY MODULE COMPRISING SAME

TECHNICAL FIELD

The present disclosure relates to a battery protection structure suitable for preventing deformation of components, caused by physical stress, while an external force is repeatedly applied to the components, and a battery module comprising the battery protection structure.

The present application claims priority to Korean Patent Application No. 10-2015-0147515 filed on Oct. 22, 2015 in the Republic of Korea, the disclosures of which are incorporated herein by reference.

BACKGROUND ART

Recently, in order to reduce the air pollution caused by exhaust gas of a vehicle, the vehicle is being manufactured based on the research to secure a driving power by using an internal combustion engine and/or an electric motor. Accordingly, the vehicle has evolved in the order of a hybrid vehicle, a plug-in hybrid vehicle, and an electric vehicle. In this case, the hybrid vehicle and the plug-in hybrid vehicle have an internal combustion engine, an electric motor and a battery pack. Also, the electric vehicle has an electric motor and a battery pack without an internal combustion engine.

Moreover, the battery pack has evolved along with the hybrid vehicle, the plug-in hybrid vehicle and the electric vehicle. The battery pack is configured to be chargeable at the outside and/or the inside of the electric vehicle. The battery pack has a battery module, and the battery module has a base plate and a battery assembly. The base plate is located under the battery assembly to place the battery assembly thereon. The battery assembly has a battery cell, a cartridge and end plates. The cartridge is configured to accommodate the battery cell.

The end plates are configured to surround the battery cell and the cartridge in a sandwich structure. The end plate has brackets projecting from one side thereof. The end plate is screwed or fitted to the base plate by means of the brackets. Thus, the end plates are fixed to the base plate and prevent movement of the battery cell and the cartridge on the base plate. In order to prevent the movement of the battery cell and the cartridge on the base plate, many studies have been carried out on the relationship between the end plate and the base plate.

One example of the studies has been disclosed in Japanese Unexamined Patent Application Publication No. 2010-272520 (published on Dec. 2, 2010) with a title of a 'battery pack'. The battery pack includes support plates located at both edges of a palette, battery modules located between the support plates, and end plates located on both sides of the battery modules, respectively. The palette has a plate shape, and the support plate has a strip shape and is fixed to the palette. The battery module has plate-like batteries.

The end plate has a reinforcing member on one side thereof, and the reinforcing member has installation flanges fixed to the end plate to protrude from one side thereof. The end plate is fitted into pins of the support plate by means of the installation flanges. By doing this, the battery modules are not moved on the palette by means of the end plates. However, when an external force is applied repeatedly along the placement direction of the end plates, the end plates perform relatively repetitive bending movements with respect to the support plates along with the battery modules.

In this case, the reinforcing member is coupled to the support plate by means of the installation flanges, and thus the installation flanges accumulate fatigue at a bending portion of the reinforcing member due to the repetitive bending movements of the end plates on the support plate, thereby generating physical deformation at the bending portion. The physical deformation of the installation flanges causes warping and/or failure of the reinforcing member.

DISCLOSURE

Technical Problem

The present disclosure is designed to solve the problems of the related art, and therefore the present disclosure is directed to providing a battery protection structure, which is suitable for preventing deformation of a flange fixed to a base plate, caused by physical stress, at an end plate located on the base plate and receives repetitive bending stress relative to the base plate, and a battery module comprising the battery protection structure.

Technical Solution

In one aspect of the present disclosure, there is provided a battery protection structure located around a battery assembly, comprising: a base plate located below the battery assembly and having a male screw member around the battery assembly; an end plate located at a side of the battery assembly on the base plate; and a reinforcing member provided below the end plate and located between a barrier of the end plate and a flange protruding from the barrier, wherein the male screw member passes through the reinforcing member and the flange, and a female screw is coupled to a male screw of the male screw member on the reinforcing member.

According to the present disclosure, the male screw member may include a screw support and the male screw, which are stacked to have a smaller diameter sequentially in an upper direction from a bottom of the base plate.

Preferably, the end plate may surround the battery assembly in a sandwich structure.

In an embodiment, the barrier may be located parallel to the battery assembly, and the flange may protrude from a lower portion of the barrier around both edges of the lower portion of the barrier and have a seating piece right below the reinforcing member.

In another embodiment, the reinforcing member may include a support piece and bent portions respectively located at both ends of the support piece to extend perpendicular to the support piece, and the support piece and the bent portions may be in contact with the flange and the barrier at the end plate.

In another embodiment, the reinforcing member and the flange may be coupled by means of the female screw and the male screw fixed to the base plate, and a screwing member freely movable relative to the base plate.

In another aspect of the present disclosure, there is provided a battery module, comprising: a battery assembly having at least one battery cell and at least one cartridge, arranged in one direction; a base plate on which the battery assembly is placed; end plates located at both sides of the battery assembly; and a reinforcing member provided at a lower portion of the end plates on the base plate and located on a seating piece at a flange of the end plates, wherein the base plate has a male screw member provided around the battery assembly to pass through the flange and the reinforcing member sequentially by means of the seating piece, and wherein a male screw of the male screw member is coupled to a female screw on the reinforcing member.

According to the present disclosure, the end plates may include a barrier and the flange, which are integrally formed, the barrier may be located perpendicular to the one direction, and the flange may protrude toward the male screw member from a lower portion of the barrier around both edges of the lower portion of the barrier.

Preferably, the flange may have a bending shape at the lower portion of the end plates.

In an embodiment, at least one seating piece may be provided to the flange at the lower portion of the end plate.

In another embodiment, the reinforcing member may include a support piece and bent portions respectively located at both ends of the support piece to extend perpendicular to the support piece, and the support piece and the bent portions may be in contact with a protruding end of the barrier at the end plates.

In another embodiment, the seating piece may have a first lower screw hole and a second lower screw hole, which are opened toward a bottom of the base plate, and the support piece may have a first upper screw hole and a second upper screw hole, respectively corresponding to the first lower screw hole and the second lower screw hole.

In another embodiment, the flange and the reinforcing member may be coupled by inserting a screwing member into the second lower screw hole of the seating piece and the second upper screw hole of the support piece.

In another embodiment, the base plate, the flange and the reinforcing member may be coupled by providing the male screw member through the first lower screw hole of the seating piece and the first upper screw hole of the support piece and coupling the female screw with the male screw of the male screw member on the reinforcing member.

In another embodiment, the male screw member may include a screw support and the male screw, which are fixed to a bottom of the base plate and stacked to have a smaller diameter sequentially in an upper direction from the bottom of the base plate.

Advantageous Effects

The battery protection structure according to the present disclosure includes a reinforcing member between the barrier of the end plate and the flange protruding from the barrier, directly above the base plate, and thus, even though the barrier is relatively and repeatedly bent relative to the base plate due to repeatedly applied external forces, it is possible to sufficiently prevent deformation of the flange caused by physical stress.

The battery module according to the present disclosure includes reinforcing members on the flange of the end plate to resist a bending stress of the barrier of the end plate, applied due to an external force at a lower side of the end plates, and thus it is possible to reliably prevent the battery cells and the cartridges between the end plates from moving on the base plate.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the embodiment described below, a battery cell refers to a lithium secondary battery. Here, the lithium secondary battery collectively refers to as a secondary battery in which lithium ions act as operation ions during charging and discharging to cause an electrochemical reaction between a positive electrode and a negative electrode. However, it is obvious that the present disclosure is not limited to the type of battery.

Figure 1:
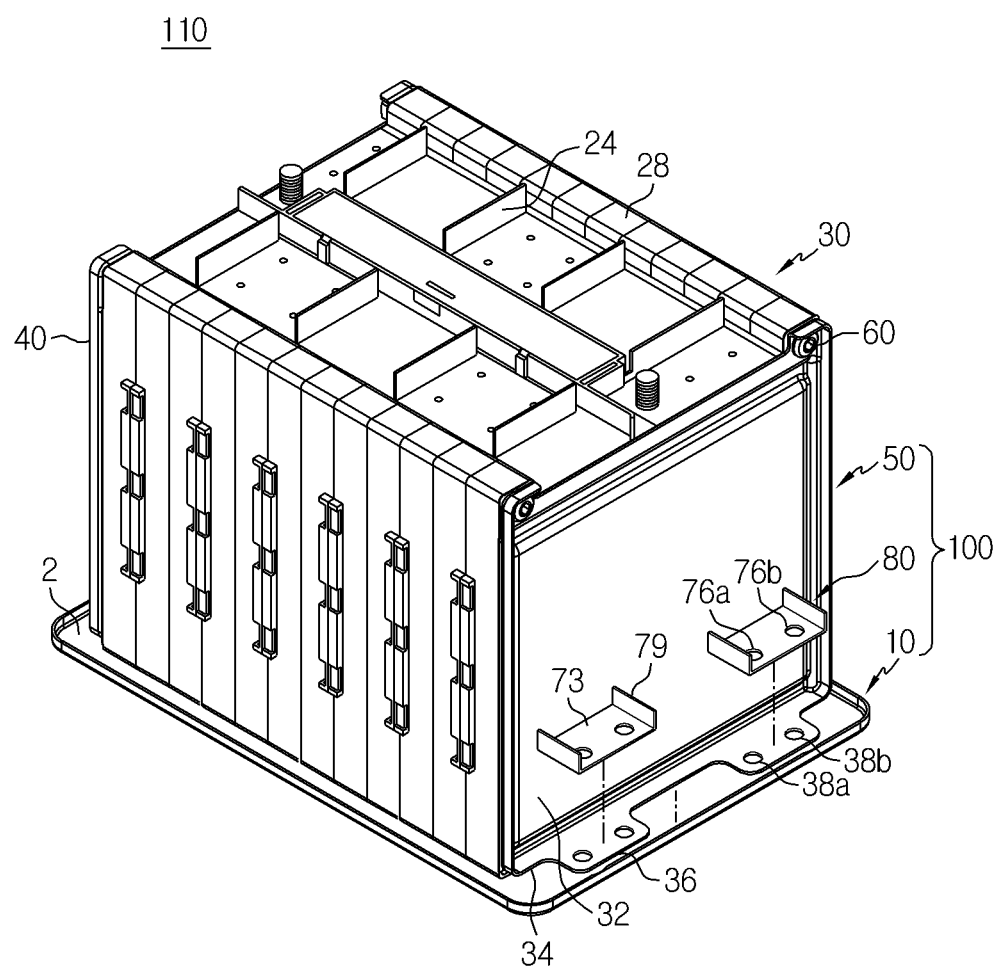
FIG. 1 is an exploded perspective view schematically showing a battery module according to an embodiment of the present disclosure.

FIG. 1 is an exploded perspective view schematically showing a battery module according to an embodiment of the present disclosure.

Referring to FIG. 1, a battery module 110 according to the present disclosure includes a base plate 10, a battery assembly 30, end plates 40, 50, and a reinforcing member 80. The base plate 10 is positioned below the battery assembly 30 and the end plates 40, 50 so that the battery assembly 30 and the end plates 40, 50 are placed thereon. Preferably, a bottom 2 of the base plate 10 may be in contact with the battery assembly 30 and the end plates 40, 50.

The battery assembly 30 includes battery cells 24 and cartridges 28 arranged along one direction. Preferably, the cartridge 28 is configured to accommodate the battery cell 24. In an embodiment, the battery cells 24 and the cartridge 28 are located between the end plates 40, 50. The end plates 40, 50 surround the battery assembly 30 in a sandwich structure.

Each of the end plates 40, 50 includes a barrier 32 and a flange 34, which are integrally formed. Preferably, the barrier 32 is located parallel to the battery cell 24 and the cartridge 28, while being perpendicular to the bottom 2 of the base plate 10. The barrier 34 is located on the base plate 10 to be perpendicular to the arrangement direction of the battery cells 24 and the cartridges 28.

In an embodiment, the flange 34 protrudes from a lower portion of the barrier 32 around both lower edges of the barrier 32. The flange 34 has a bent shape at the lower portion of the barrier 32. The flange 34 has seating pieces 36 at the lower portion of the barrier 32. Preferably, the seating pieces 36 protrude from the flange 34 to provide a relatively wide and flat surface at the flange 34.

The seating piece 36 has a first lower screw hole 38a and a second lower screw hole 38b, which are sequentially located from a central region of the flange 34 toward an edge thereof. Preferably, the first lower screw hole 38a and the second lower screw hole 38b are opened toward the bottom 2 of the base plate 10. The reinforcing members 80 are positioned right above the flange 34 and arranged to correspond to the seating pieces 36, respectively.

The reinforcing member 80 has a support piece 73 and bent portions 79. The support piece 73 corresponds to the seating piece 36 of the flange 34. More specifically, the support piece 73 has a first upper screw hole 76a and a second upper screw hole 76b aligned with the first lower screw hole 38a and second lower screw hole 38b of the seating piece 36, respectively. The bent portions 79 are located at both ends of the support piece 73 and extend perpendicularly to the support piece 73.

Here, the base plate 10, the end plates 40, 50 and the reinforcing member 80 configure a battery protection structure 100. Meanwhile, the cartridges 28 and end plates 40, 50 are coupled by means of long bolts 60. The long bolts 60 are provided to pass through the edges of the end plates 40, 50 at an upper portion of the end plates 40, 50.

Figure 2:
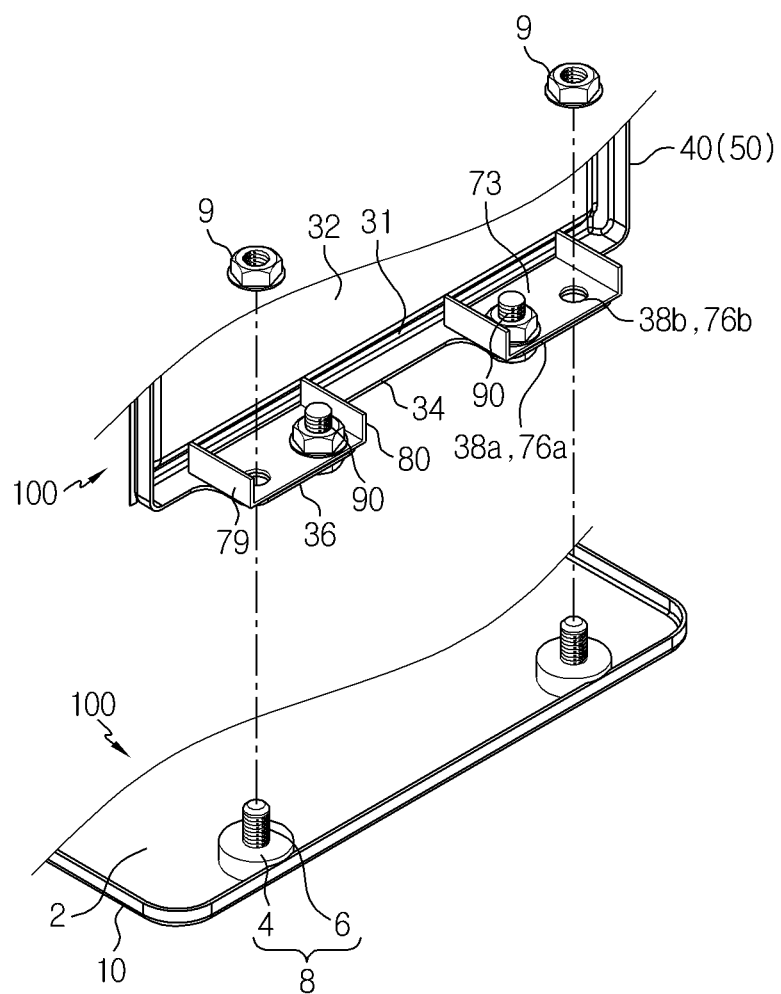
FIG. 2 is an exploded perspective view showing the battery protection structure of FIG. 1 in detail with a partially enlarged view.

FIG. 2 is an exploded perspective view showing the battery protection structure of FIG. 1 in detail with a partially enlarged view.

Referring to FIG. 2, in the battery protection structure 100, the base plate 10 has male screw members 8 around the battery assembly 30 of FIG. 1. Preferably, the male screw members 8 are located at edges of the base plate 10 which face each other. In an embodiment, the male screw member 8 includes a screw support 4 and a male screw 6, which are stacked so as to have a smaller diameter sequentially in an upper direction from the bottom 2 of the base plate 10.

In another embodiment, the male screw members 8 are fixed to the bottom 2 of the base plate 10 by means of the screw support 4. In another embodiment, the base plate 10 is made of metal. The protection members 80 are located between the barrier 32 of the end plate 40 or 50 and the flange 34 protruding from the barrier 32 at the lower portion of the end plate 40 or 50. More specifically, the flange 34 protrudes from the lower portion of the barrier 32 toward the male screw members 8 around both lower edges of the barrier 32.

The flange 34 has seating pieces 36 on which the protection members 80 are placed, respectively. Preferably, the support piece 73 of the protection member 80 is positioned on the seating piece 36 of the flange 34. In an embodiment, the first upper screw hole 76a and the second upper screw hole 76b of the support piece 73 are positioned corresponding to the first lower screw hole 38a and the second lower screw hole 38b of the seating piece 36, respectively.

In addition, the barrier 32 also has a protruding end 31 in contact with the protection member 80. Preferably, the protruding end 31 protrudes from a lower edge of the barrier 32 toward the protection member 80 to contact the support piece 73 and the bent portions 79. In an embodiment, the protruding end 31 forms a barrier bending preventing region at the lower portion of the barrier 32. Meanwhile, the end plate 40 or 50 and the protection member 80 are coupled by inserting a screwing member 90 into the first lower screw hole 38a of the seating piece 36 and the first upper screw hole 76a of the support piece 73.

The male screw 6 may pass through the second lower screw hole 38b of the seating piece 36 and the second upper screw hole 76b of the support piece 73 sequentially and be screwed with the female screw 9 on the support piece 73 in order to couple the base plate 10, the end plate 40 or 50 and the protection member 80. Here, the end plate 40 or 50 and the protection member 80 are made of metal.

Figure 3:
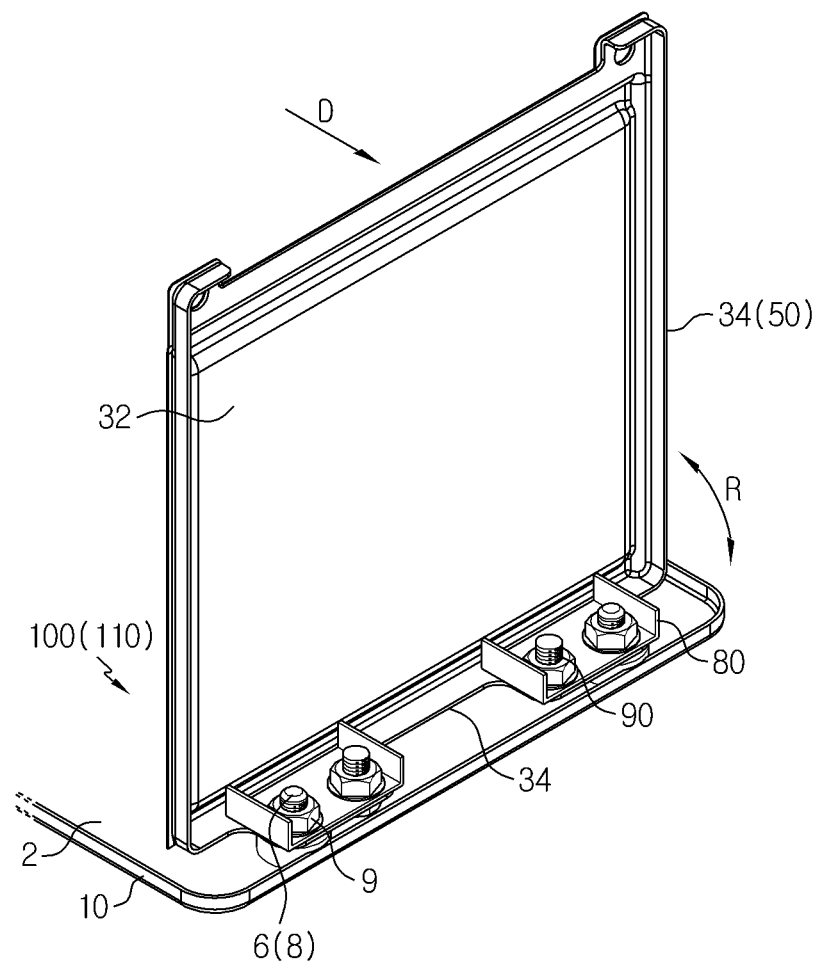
FIGS. 3 and 4 are schematic views for illustrating an operation mechanism of the battery module of FIG. 1.
Figure 4:
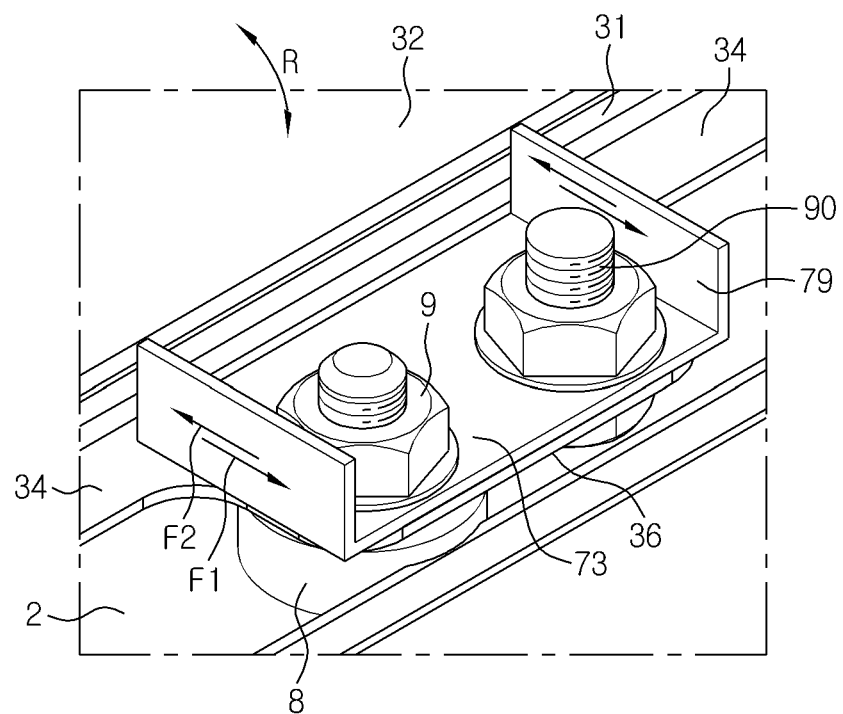

FIGS. 3 and 4 are schematic views for illustrating an operation mechanism of the battery module of FIG. 1. In FIGS. 3 and 4, among the end plates 40, 50, only one end plate 50 will be described.

Referring to FIG. 3, when an external force is repeatedly applied to the battery module 110 along a first direction D, the external force may give a bending stress to the battery assembly 30 and the end plate 50 of FIG. 1 in a second direction R. The first direction D may be an arrangement direction of the battery cells 24 and the cartridge 28 at the battery assembly 30.

The bending stress may move the battery assembly 30 and the end plate 50 together with respect to the base plate 10. By doing this, the barrier 32 of the end plate 50 may move right and left by the bending stress with respect to the original shape.

More specifically, the bending stress applied to the barrier 32 may transmit an external force to the flange 34 between the base plate 10 and the reinforcing members 80 at the lower portion of the end plate 50. The external force may cause elastic deformation to the flange 34. However, the elastic deformation may be limited due to the contact of the barrier 32 and the reinforcing members 80 at the lower portion of the end plate 50.

In this case, the reinforcing members 80 are coupled to the flange 34 by means of the female screws and 9 the male screws 6 fixed to the base plate 10, and the screwing member 90 freely movable relative to the base plate 10.

Referring to FIG. 4, while the barrier 32 of the end plate 50 is subjected to repetitive bending stresses in the second direction R, the barrier 32 may transmit a first force F1 to the support piece 73 and the bent portions 79 of the reinforcing members 80, respectively, through the protruding end 31. The first force F1 may be a part of an external force. The rest of the external force may be transmitted to the base plate 10 through the male screw members 8 and the seating piece 36 and become extinct.

The first force F1 may push the protruding end 31 towards the support piece 73 and the bent portions 79. In contrast, the reinforcing member 80 may apply a second force F2 towards the protruding end 31 in response to the first force F1. The second force F2 may push the support piece 73 and the bent portions 79 toward the protruding end 31. The second force F2 has the same intensity as the first force F1 and acts in a direction opposite to the first force F1.

In this way, the support piece 73 and the bent portions 79 may minimize elastic deformation of the flange 34 by resisting the repetitive bending movement of the barrier 32. More specifically, the support piece 73 and the bent portions 79 may sufficiently prevent the deformation of the flange 34, caused by physical stress due to the elastic deformation of the flange 34 around the protruding end 31.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery protection structure located around a battery assembly, comprising: a base plate located below the battery assembly and having male screw members around the battery assembly; an end plate located at a side of the battery assembly on the base plate, the end plate having a barrier and a flange integrally formed with and extending outwardly from the barrier in a first direction, the flange contacting the base plate; a pair of seating pieces extending in the first direction from the flange and contacting the base plate; and a reinforcing member on each of the seating pieces so that each of the seating pieces is between the base plate and a respective reinforcing member, wherein each of the reinforcing members includes a support piece and a pair of bent portions, one of the bent portions respectively located at each end of the support piece to extend upwardly from the support piece in a second direction, the second direction being different than the first direction, wherein each of the male screw members passes through the support pieces of one of the reinforcing members, and a female screw is coupled to a male screw of each male screw member, wherein the support piece and the bent portions are in contact with a respective seating piece and the barrier of the end plate, and wherein each support piece has a bottom surface directly contacting a respective seating piece, a front edge and a rear edge, the front edge directly contacting the barrier.

2. The battery protection structure according to claim 1, wherein each of the male screw members includes a screw support and the male screw, which are stacked to have a smaller diameter sequentially in an upper direction from a bottom of the base date.

3. The battery protection structure according to claim 1, wherein the end plate surrounds the battery assembly in a sandwich structure.

4. The battery protection structure according to claim 1, wherein the barrier is located parallel to the battery assembly.

5. The battery protection structure according to claim 1, wherein each of the reinforcing members and seating pieces are coupled by the female screws and the male screws fixed to the base plate, and a screwing member freely movable relative to the base plate.

6. A battery module, comprising: a battery assembly having at least one battery cell and at least one cartridge, arranged in a first direction; a base plate on which the battery assembly is placed; end plates located at opposite sides of the battery assembly, each end plate having a flange extending in the first direction; a pair of seating pieces extending in the first direction from the flange and contacting the base plate; and a reinforcing member provided at a lower portion of each of the end plates on the base plate and boated on each of the seating portions so that the seating portion is between the base plate and a respective reinforcing member, wherein each reinforcing member includes a support piece and a pair of bent portions, one of the bent portions respectively boated at each end of the support piece to extend perpendicular to the support piece, wherein the base plate has male screw members provided around the battery assembly to pass through the seating portions and the support pieces sequentially, wherein a male screw of each of the male screw members is coupled to a female screw, wherein the support piece and the bent portions are in contact with a respective seating piece and the barrier of the end plate, wherein each support piece has a bottom surface directly contacting a respective seating piece, a front edge and a direction being different than the first direction.

7. The battery module according to claim 6, wherein each of the end plates includes a barrier and the flange, which are integrally formed,
wherein the barrier is located perpendicular to the first direction, and
wherein the flange protrudes toward the male screw members from a lower portion of the barrier around the lower portion of the barrier.

8. The battery module according to claim 6, wherein the flange has a bending shape at the lower portion of the end plates.

9. The battery module according to claim 6, wherein each seating piece has a first lower screw hole and a second lower screw hole, which are opened toward a bottom of the base plate, and
wherein each support piece has a first upper screw hole and a second upper screw hole, respectively corresponding to the first lower screw hole and the second lower screw hole.

10. The battery module according to claim 9, wherein the flange and the reinforcing member are coupled by inserting the male screw members into the second lower screw hole of each of the seating pieces and the second upper screw hole of each support piece.

11. The battery module according to claim 9, wherein the base plate, the flange and the reinforcing member are coupled by providing the male screw member through the first lower screw hole of each seating piece and the first upper screw hole of each support piece and coupling the female screw with the male screw of the male screw member on the respective reinforcing member.

12. The battery module according to claim 6, wherein each of the male screw members includes a screw support and the male screw, which are fixed to a bottom of the base plate and stacked to have a smaller diameter sequentially in an upper direction from the bottom of the base plate.

* * * * *